(12) United States Patent  
Tsuya

(10) Patent No.: US 7,527,115 B2
(45) Date of Patent: May 5, 2009

(54) MOTORCYCLE AIR INTAKE COMPONENT COOLING SYSTEM

(75) Inventor: Koji Tsuya, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 191 days.

(21) Appl. No.: 11/562,290

(22) Filed: Nov. 21, 2006

(65) Prior Publication Data

US 2007/0144802 A1 Jun. 28, 2007

(30) Foreign Application Priority Data

Nov. 25, 2005 (JP) ............................. 2005-340814

(51) Int. Cl.
F02P 1/02 (2006.01)
(52) U.S. Cl. ..................... 180/68.2; 123/41.6
(58) Field of Classification Search ............... 180/68.3, 180/281.1, 263, 229, 291, 68.1, 219, 68.2; 123/184.21, 41.7; 55/482
See application file for complete search history.

(56) References Cited

U.S. PATENT DOCUMENTS

| 4,793,293 | A | * | 12/1988 | Minami ..................... 123/41.7 |
| 5,174,258 | A | * | 12/1992 | Tanaka ..................... 123/198 E |
| 5,560,446 | A | * | 10/1996 | Onishi ........................ 180/219 |
| 5,775,450 | A | * | 7/1998 | Porter et al. ............... 180/68.1 |
| 6,591,934 | B2 | * | 7/2003 | Tsutsumikoshi ............ 180/291 |
| 6,874,362 | B2 | * | 4/2005 | Myers et al. ............. 73/204.27 |
| 7,282,076 | B2 | * | 10/2007 | Mahan ........................ 55/482 |
| 7,331,322 | B2 | * | 2/2008 | Seki et al. ............. 123/184.21 |
| 7,357,205 | B2 | * | 4/2008 | Nishizawa ................ 180/68.3 |
| 2004/0050357 | A1 | * | 3/2004 | Idei et al. ................. 123/198 E |
| 2004/0060545 | A1 | * | 4/2004 | Kurayoshi et al. .......... 123/472 |

FOREIGN PATENT DOCUMENTS

JP 2000-085664 3/2000

* cited by examiner

Primary Examiner—Paul N Dickson
Assistant Examiner—Levon Fiore
(74) Attorney, Agent, or Firm—Hogan & Hartson LLP

(57) ABSTRACT

A motorcycle that effectively cools vehicle parts without a special cooling duct has a body frame, an engine and an intake system that supplies air to the engine. A parts cooling system makes air diverge from the intake system, and introduces the diverging air to vehicle parts such as electrical parts and an alternator.

6 Claims, 5 Drawing Sheets

[FIG. 1]
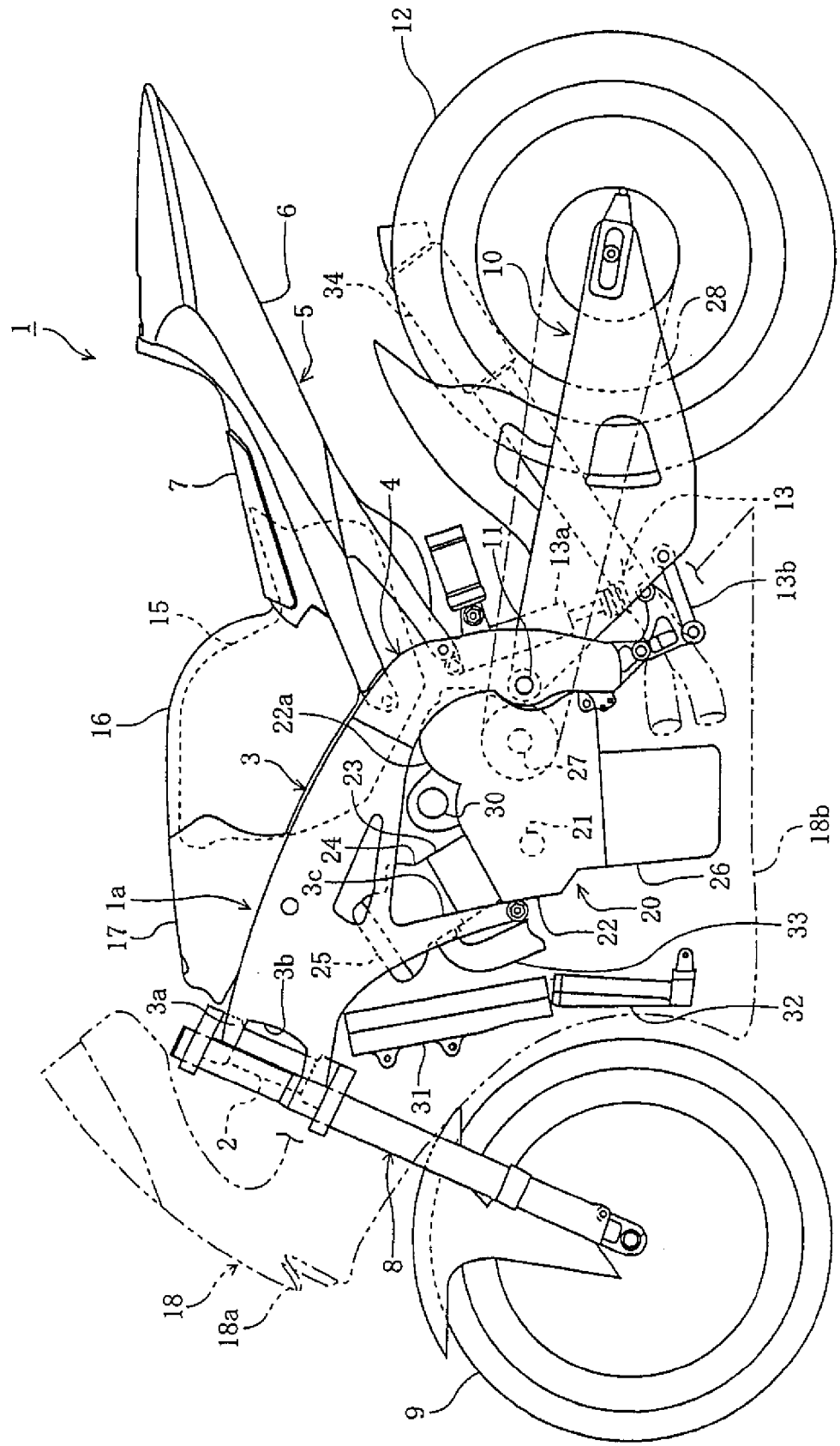

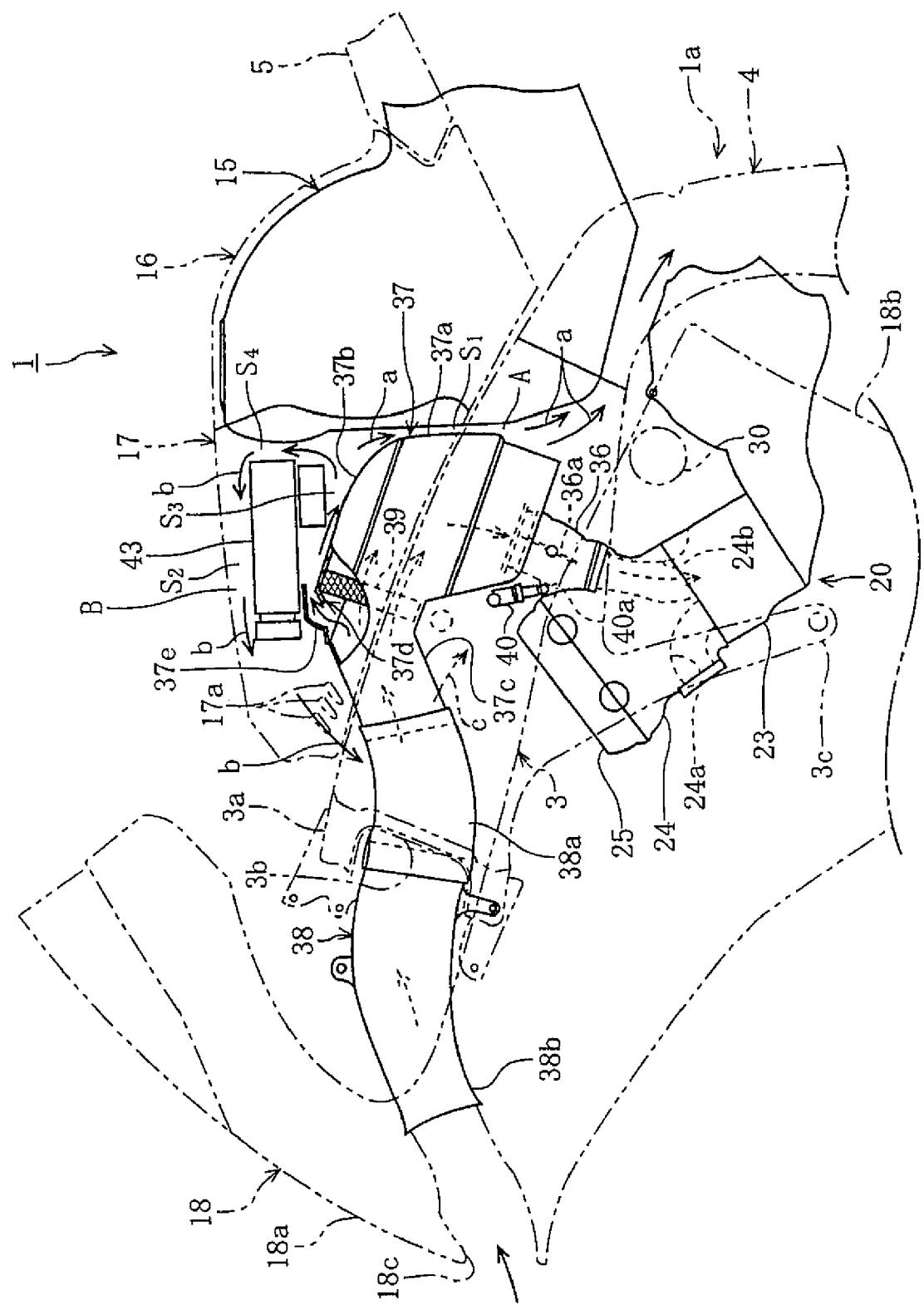
[FIG. 2]

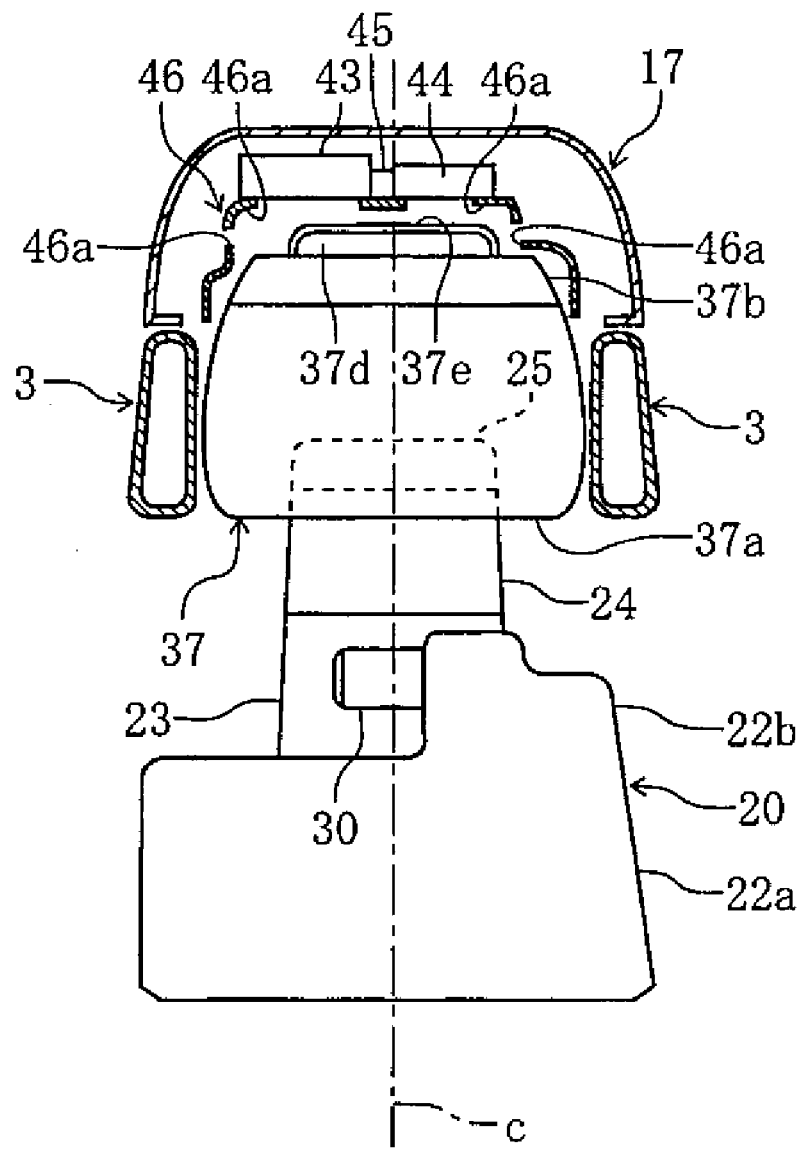
[FIG. 3]

[FIG. 4]
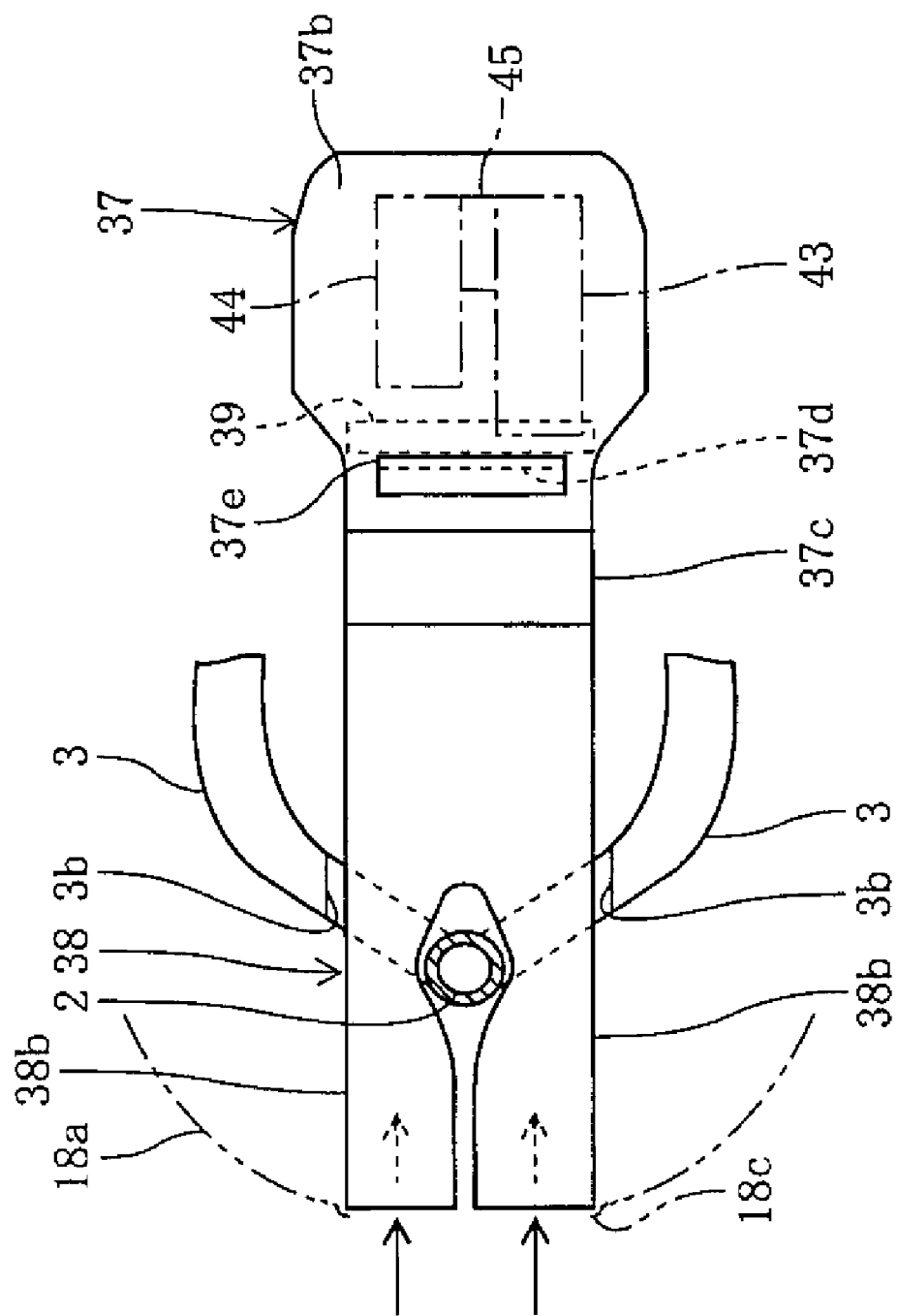

[FIG. 5]
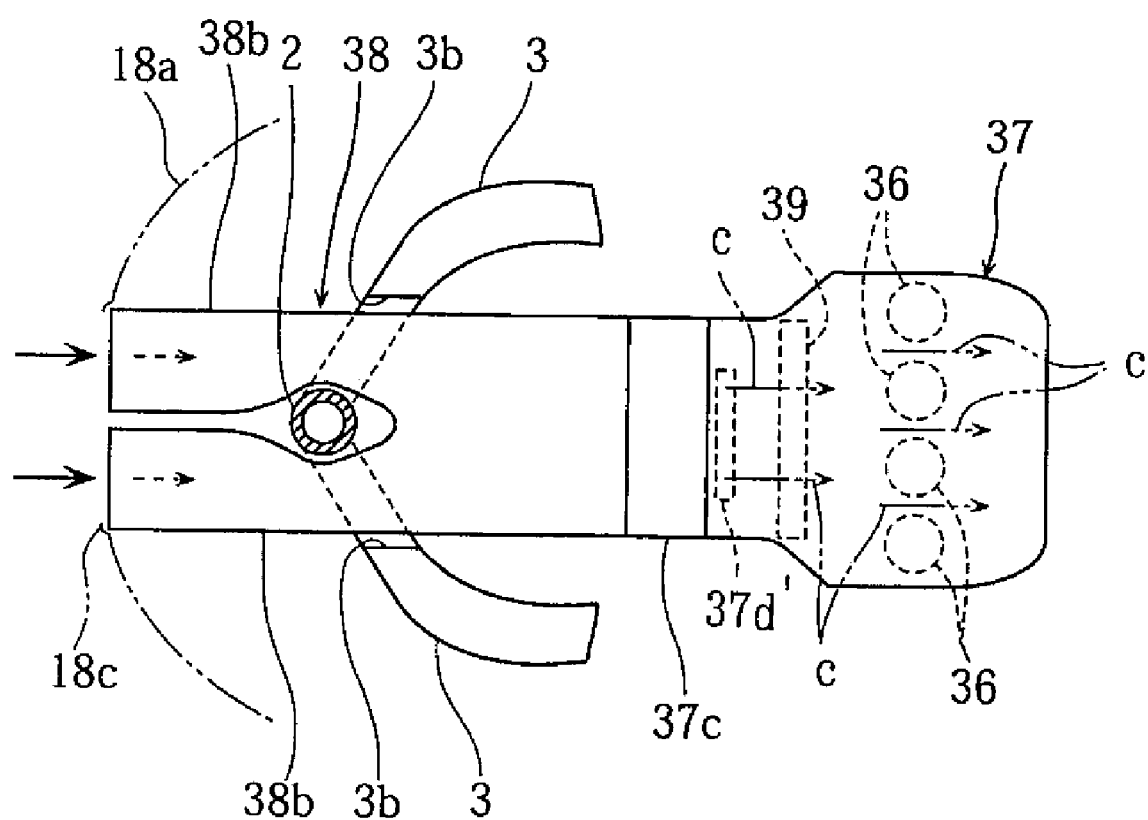

MOTORCYCLE AIR INTAKE COMPONENT COOLING SYSTEM

RELATED APPLICATIONS

This application claims the benefit of priority under 35 USC 119 of Japanese patent application no. 2005-340814, filed on Nov. 25, 2005, which application is hereby incorporated by reference in its entirety.

BACKGROUND OF THE INVENTION

1. Field of the Invention

The present invention relates to an intake system for supplying air to a motorcycle engine.

2. Description of Related Art

In some motorcycles, the front part and left and right sides of an engine are enclosed by a cowling. A duct extending forward is connected to an air cleaner supplying filtered air to the engine, and the duct is connected to an opening formed on the front face of the cowling to introduce running wind into the air cleaner (see JP-A-2000-85664, for example).

When a cowling enclosing the front part and left and right sides of the engine is employed, the temperature inside the cowling can rise easily due to heat from the engine, possibly causing thermal damage to vehicle parts. For this reason, the air introduction port is formed on the cowling to introduce running air to cool down the vehicle parts.

A structure simply introducing running wind from the introduction port on the cowling may not attain adequate air flow within the cowling, and may not effectively cool down the vehicle parts.

On the other hand, connecting a special cooling duct to the air introduction port on the cowling to supply cooling air to the vehicle parts leads to concerns about additional layout space for the cooling duct, an increase in the number of parts and a more complicated structure as the special cooling duct is disposed.

SUMMARY OF THE INVENTION

The present invention addresses these issues and provides a motorcycle that effectively cools vehicle parts without a special added cooling duct.

The present invention is directed to a motorcycle including a body frame, an engine installed on the body frame, an intake system for supplying air to the engine, and a parts cooling system for making air diverge from the intake system, and introducing the diverging air to vehicle parts in the vicinity of the engine.

According to the motorcycle of the present invention, air diverging from the intake system is supplied to the vehicle parts in the vicinity of the engine. Thus, the vehicle parts are cooled down efficiently by the diverging air flow. More specifically, the inside of the intake air passage is kept under relatively high positive pressure because of the dynamical pressure exerted by the running wind, and the temperature is low. Therefore, adequate air flow is obtained without any special cooling duct by branching out the parts cooling system from the engine intake system. As a result, cooling of the vehicle parts is improved without layout space problems, increased numbers of parts, or a more complicated structure.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motorcycle according to an embodiment of the present invention.

FIG. 2 is a side view of a parts cooling system on the motorcycle in FIG. 1.

FIG. 3 is a rear schematic view of the parts cooling system in FIG. 2.

FIG. 4 is a top schematic view of the parts cooling system in FIG. 2.

FIG. 5 is a top plan view of a parts cooling system according to another embodiment of the invention.

DETAILED DESCRIPTION OF THE INVENTION

An embodiment of the present invention is described with reference to the attached drawings.

FIGS. 1-4 illustrate a motorcycle according to an embodiment of the present invention. In the following description, the terms "right," "left," "front" and "rear" refer to the right, left, front and rear sides from the perspective of a rider seated on the seat.

In the drawings, reference numeral 1 denotes a motorcycle having a front wheel 9 and a rear wheel 12 disposed in front of and in the rear of a body frame 1a, respectively, with an engine 20 suspended and supported beneath the body frame 1a. The body frame 1a is covered with a cowling 18 in the areas forward, on the left side, and on the right side of the engine 20.

The body frame 1a has a head pipe 2, left and right tank rails 3, 3, slanting downward from the head pipe 2 to the rear of the vehicle, and rear arm brackets 4, 4, extending downward from the rear ends of the tank rails 3, 3. A seat 5 is mounted on the rear arm brackets 4, 4.

The seat 5 includes a seat frame 6 that is mounted to the upper end part of the rear arm brackets 4, 4 and slants upward to the rear of the vehicle, and a seat cushion 7 disposed on the seat frame 6.

A front fork 8 is pivotally supported by the head pipe 2 so that it can be steered to both sides. A front wheel 9 is rotatably supported by the lower end of the front fork 8, and steering handlebars (not shown) are mounted to the upper end of the front fork 8.

A rear arm 10 is supported by the vertical center part of the rear arm brackets 4 in a vertically swingable manner via a pivot shaft 11. A rear wheel 12 is rotatably supported by the rear end of the rear arm 10. A rear suspension 13 having a cushion unit 13a and a linkage 13b is disposed between the rear arm 10 and the rear arm brackets 4, 4.

A fuel tank 15 is installed between the tank rails 3, 3. The fuel tank 15 is disposed above and behind engine 20. Most of fuel tank 15 protrudes upward from the tank rails 3, 3.

A tank cover 16 spreads over the fuel tank 15. The area forward of the fuel tank 15 between the tank rails 3, 3 is covered from above by a top cover 17.

The tank cover 16 is attached to the fuel tank 15. The top cover 17 is installed detachably on the tank cover 16.

The vertical dimension of tank rails 3, 3 is greater than their transversal dimension, so that tank rails 3, 3, form a vertically long rectangular in the cross sectional view. In the vicinity of the head pipe 2, the tank rails 3, 3 are formed such that the distance in the vehicle's transverse direction between them decreases as they come closer to the head pipe 2, and its forward end 3a is joined to the head pipe 2 by means of welding. An under frame part 3c is formed integrally in the forward part of the tank rails 3, 3, to extend downwardly to the rear running along the side of the engine 20.

A front part 18a of cowling 18 covers the forward part of the head pipe 2, and side parts 18b, 18b cover the left and right sides of the engine 20 spreading downward from the lower edge of the left and right tank rails 3, 3. An opening 18c is formed in the front part 18a to introduce running wind into the cowling 18.

The engine 20 is preferably a water-cooled four-stroke-cycle engine of a parallel 4-cylinder type. The engine 20 comprises a crankcase 22 accommodating a crankshaft 21 joined with tightening bolts to a cylinder block 23 common to every cylinder. A cylinder head 24 and a head cover 25 are stacked on top of the upper mating face of the crankcase 22, while the lower mating face of the crankcase 22 is connected to an oil pan 26.

A transmission case 22a containing a transmission (not shown) is formed integrally in the rear of the crankcase 22. An output shaft 27 for taking out the engine rotation is disposed at the transmission case 22a, and the rear wheel 12 is driven rotationally by the output shaft 27 via a chain 28.

Upper and lower radiators 31, 32 are disposed forward of the engine 20 to maintain the engine cooling water at a predetermined temperature.

An alternator (electric generator) 30 is behind engine 20. The alternator 30 opposes the bottom of the fuel tank 15 and is on the vehicle's centerline "C". The alternator 30 is attached to an inner side wall of transmitting part 22b projecting upwardly from the transmission case 22a such that the alternator 30 is exposed outward. Alternator 30 is driven rotationally by the crankshaft 27 via the transmission system disposed inside of the transmitting part 22b.

The exhaust system of the engine 20 has four exhaust pipes 33 joined in communication with exhaust ports 24a formed for each cylinder on the forward wall of the cylinder head 24, extending downward from the forward wall of the cylinder head 24 to run below the engine 20, and further extending to the rear of the vehicle, as well as a muffler 34 connected to each of the exhaust pipes 33 and disposed on the right side of the rear wheel 12.

The intake system of the engine 20 has four throttle bodies 36 joined in communication with intake ports 24b formed for each cylinder on the rear wall of the cylinder head 24 and extending generally upward with a throttle valve 36a contained therein, a common air cleaner 37 connected to the throttle bodies 36, and an air duct 38 for introducing the air into the air cleaner 37.

Each of the throttle bodies 36 is equipped with a fuel injection valve 40. The fuel injection valve 40 is disposed so that the injection orifice 40a is pointing at the axial line of the intake ports 24b.

The air cleaner 37 has a cleaner box 37a, and an element 39 composed of a filtering media disposed to define the first chamber and the second chamber inside the cleaner box 37a. The cleaner box 37a is disposed between the tank rails 3, 3 and is shaped as a wide box protruding upward from the tank rails 3, 3. An introduction part 37c is formed integrally in and protrudes upward from the upper part of the front wall on the cleaner box 37a. A lid member 37b is mounted detachably to the upper end opening on the cleaner box 37a that extends over the introduction part 37c. Note that the element 39 is disposed near the boundary of the cleaner box 37a and the introduction part 37c. Each of the throttle bodies 36 is joined in communication with the bottom wall of the cleaner box 37a.

The air cleaner 37 is disposed above the engine 20 and in front of the fuel tank 15, to form a gap s1 between the rear wall of the air cleaner 37 and the front wall of the fuel tank 15. The upper part of the air cleaner 37 is covered with a top cover 17.

Element 39 may be replaced by removing the top cover 17 and then detaching the lid member 37b.

The air duct 38 is made of plastic having a smaller heat conductivity, and is branched into Y-shape in the upper stream part. A downstream end 38a of the air duct 38 is joined to the introduction part 37c, while the Y-shaped branched parts 38b, 38b are joined to the opening 18c formed at the front end of the cowling 18.

Left and right duct holes 3b, 3b are penetratingly formed in the fore-and-aft direction at the connecting part of the left and right tank rails 3, 3 to the head pipe 2. The branched parts 38b, 38b of the air duct 38 run through the left and right duct holes 3b, 3b, and then connected to the opening 18c of the cowling 18

Running wind flowing in through the opening 18c is introduced into the air cleaner through the air duct 38, filtered by the element 39, and delivered to the inner part of the intake ports 24b after passing through the throttle bodies 36.

Electrical parts, such as an ECU 43 for controlling the fuel injection amount and injection timing of the fuel injection valve 40 based on the operating conditions of the engine 20, a regulator 44 for adjusting the amount of current generated and supplied by the alternator 30, and an amplifier 45 for amplifying the detected values from the $O_2$ sensor (not shown) attached to the exhaust pipes 33 and outputting them to the ECU 43, are disposed in parallel in the vehicle's transverse direction inside the top cover 17.

Electrical parts 43-45 are mounted to a supporting bracket 46 generally taking the shape of gate and supported by the body frame 1a. Cooling holes 46a are formed in parts of the supporting bracket 46 facing electrical parts 43-45. Maintenance on electrical parts 43-45 can be performed by removing top cover 17.

Each of the electrical parts 43-45 is disposed to provide a predetermined gap s2 below the top cover 17, a predetermined gap s3 above the lid member 37b of the air cleaner 37 and a predetermined gap s4 forward of the fuel tank 15.

A parts cooling system is provided above the engine 20 such that air coming from the intake system diverges, and the split or diverged air a, b is introduced to the alternator 30 and the electrical parts 43-45 disposed in the vicinity of the engine 20. A main cooling flow channel "A" introduces air to the area around the alternator 30, and a secondary cooling flow channel "B" introduces air to the area around the electrical parts 43-45.

A diverging air port 37d, opening to face the gap s3 lying between the lid member 37b and the electrical parts 43-45, is formed on the lid member 37b of the air cleaner 37. The diverging air port 37d is formed at the front end of the lid member 37b, and in the vicinity of the element 39 at its upstream side.

An appentice part 37e is formed at the front edge of the diverging air port 37d and extends to cover the diverging air port 37d. The air flow through the air port 37d is directed to flow rearward through the gap s3 by the appentice part 37e.

Plural air discharge ports 17a are formed at the left and right sides of the top cover 17 near its front end. Air discharge ports 17a are located forward of electrical parts 43-45, and are exposed outward on both sides above the cowling 18.

The main cooling flow channel "A" is constructed so that air diverged through the diverging air port 37d flows rearward through the gap s3, hits the fuel tank 15 to flow downward through the gap s1 between the fuel tank 15 and the air cleaner 37, and then flows along the bottom part of the fuel tank 15 in the vicinity of the alternator 30. The lower parts of electrical parts 43-45, the bottom part of fuel tank 15, and alternator 30 are cooled by air 'a' flowing through cooling flow channel A.

The secondary cooling flow channel "B" is constructed so that air diverged by the diverged air port 37d flows rearward through the gap s3, hits the fuel tank 15 to flow upward through the gap S4 between the fuel tank 15 and the electrical parts 43-45, flows forward through the gap S2 between the electrical parts 43-45 and the top cover 17, and is then discharged to the outside from the air discharge ports 17a on the top cover 17. The upper parts of electrical parts 43-45 and the upper part of the fuel tank 15 are cooled by air 'b' flowing through flow channel "B".

The present invention provides a structure such that the air 'a' diverging through the diverging air port 37d of the air cleaner 37 flows in the vicinity of the lower parts of electrical parts 43-45, and also flows in the vicinity of the alternator 30, while air 'b' flows in the vicinity of the upper parts of electrical parts 43-45. This enables effective cooling of the upper parts of electrical parts 43-45 by air 'b' and the lower parts of electrical parts 43-45 and the alternator 30 by air 'a' diverging from the intake system. More specifically, the inside of the intake air passage formed by the air duct 38 and the introduction part 37c of the air cleaner 37 is kept under relatively high positive pressure because of the dynamical pressure exerted by the running wind, with the temperature being equivalent to the ambient air. Therefore, adequate air flow is obtained without any special cooling duct by branching out the parts cooling system from the intake air passage of the intake system. As a result, cooling of electrical parts 43-45 and the alternator 30 is improved without layout space problems, increased numbers of parts, or a more complicated structure.

According to the present invention, the diverging air port 37d is formed upstream of the element 39 to allow diverging of air at a point of highest dynamical pressure. Thus, the amount of air taken from diverging air port 37d can be increased while maintaining the required amount of air to be supplied to engine 20.

The present invention provides a structure such that diverging air flows rearward between the air cleaner 37 and the top cover 17. This enables a more reliable flow of diverging air. Since the self-heating ECU 43, regulator 44, and amplifier 45 are disposed in the reliable air flow running between the air cleaner 37 and the top cover 17, electrical parts 43-45 are cooled down positively, and rise in temperature of these parts is restrained.

The gap s3 is created above the air cleaner 37 such that electrical parts 43-45 are disposed in it, and the gap s2 is provided between electrical parts 43-45 and the top cover 17, with the air discharge port 17a being formed on the top cover 17. This makes air diverging from the diverging air port 37d flow rearward through the gap s3 to hit the fuel tank 15, go upward through the gap s4 between the fuel tank 15 and the electrical parts 43-45, and to flow forward through the gap s2 to be discharged from the air discharge ports 17a. Thus, electrical parts 43-45 are cooled by air 'b' flowing as if it encloses the periphery of the electrical parts 43-45 on the lower side and the upper side, and cooling efficiency is improved further. More specifically, since the air flow rate around the external surface of the top cover 17 is high while the motorcycle is running, negative pressure is exerted on the air discharge ports 17a. On the other hand, positive pressure is exerted in the space between the air cleaner 37 and the top cover 17, because the diverging air is flowing in. Thus, air flow that runs as if it wraps around electrical parts 43-45 from the lower part to the upper part is formed.

In addition, diverging air flows to the alternator 30 after passing through the gap s1 between the air cleaner 37 and the fuel tank 15. This allows reliable cooling of the alternator even though the alternator 30 (having a large heating value) is disposed behind engine 20.

According to the present invention, the duct hole 3b is formed at the connecting part of the tank rails 3, 3 to the head pipe 2, and the air duct 38 connected to the opening 18c of the cowling 18 is inserted through the duct hole 3b. This prevents an increase in intake air temperature. More specifically, when holes are made on the tank rails and are themselves used as part of the air duct, the tank rails can easily reach a high temperature due to engine heat, and thus there is a concern that intake air temperature will rise to deteriorate the filling efficiency. According to the present invention, increase in intake air temperature is restrained because the air duct 38 made of carbon passes through the duct hole 3b.

In the embodiment described above, although the diverging air port 37d is described as formed in the vicinity of the element 39 at its upstream side, it may alternatively be formed at the downstream side of the element 39.

Also, in the embodiment described above, the diverging air port 37d is formed at the front end of the lid member 37 that constitutes the upper wall of the air cleaner to make diverging air flow in the upper part of the air cleaner. However, the diverging air port 37d' may be alternatively formed, for instance, on the lower wall of the introduction port 37c as shown in FIGS. 2 and 5 to make the air 'c' diverging through the diverging air port 37d', and to make the air 'c' flow to the alternator 30 through the gap between the throttle bodies 36. In this case, the fuel injection valve 40, the throttle bodies 36, and the alternator 30 are cooled down effectively.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
   a body frame;
   an engine installed on the body frame; and
   an intake system for supplying air to the engine comprising:
      an air cleaner connected to a cylinder head of the engine, the air cleaner comprising an element for filtering the air disposed inside of an air cleaner box and a lid member mounted at an upper end of the air cleaner box; and
      an air duct for drawing in the air from an opening formed in a front part of the motorcycle and for introducing the air into the air cleaner;
   a parts cooling system that makes the air diverge from the intake system at an upstream side of the element and introduces the diverging air to vehicle parts in the vicinity of the engine; and
   a cover that covers the air cleaner from above, wherein the parts cooling system makes the diverging air flow between the air cleaner and the cover.

2. The motorcycle according to claim 1, wherein:
   the vehicle parts include electrical parts disposed above the air cleaner with a gap defined between the electrical parts and the air cleaner, and
   the parts cooling system makes the diverging air flow through the gap between the air cleaner and the electrical parts.

3. The motorcycle according to claim 1, further comprising:
   a fuel tank disposed behind the intake system and above the engine; and an electric generator disposed behind the engine opposing the fuel tank, wherein the parts cooling system makes the diverging air flow through the gap formed between the fuel tank and the engine and into a vicinity of the electric generator.

4. The motorcycle according to claim 1, wherein the vehicle parts include electrical parts disposed above the air cleaner with a gap defined between the electrical parts and the air cleaner, the cover covers the electrical parts and the air cleaner from above and has air discharge ports formed therein, and the parts cooling system makes the diverging air flow rearward through the gap between the air cleaner and the electrical parts, forward through the gap between the electrical parts and the cover, and out from the air discharge ports.

5. The motorcycle according to claim 1, wherein the engine is a multi-cylinder engine, the intake system connects the air cleaner to the engine, a throttle body containing a throttle valve is provided for each cylinder of the engine, and the parts cooling system makes the diverging air flow through gaps defined between throttle bodies.

6. The motorcycle according to claim 1, wherein the body frame has a head pipe supporting a front fork, and left and right tank rails connected to the head pipe, and an air duct in the intake system connecting the opening at the front part of the motorcycle to the air cleaner passes through a duct hole penetrating a connecting portion of the head pipe and the tank rails.

\* \* \* \* \*